(12) United States Patent
Ogihara

(10) Patent No.: US 7,262,908 B2
(45) Date of Patent: Aug. 28, 2007

(54) MICROSCOPE SYSTEM

(75) Inventor: Yasushi Ogihara, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/633,458

(22) Filed: Dec. 5, 2006

(65) Prior Publication Data
US 2007/0081232 A1 Apr. 12, 2007

Related U.S. Application Data

(62) Division of application No. 10/625,545, filed on Jul. 24, 2003, now Pat. No. 7,167,305.

(30) Foreign Application Priority Data

Jul. 30, 2003 (JP) ............................. 2002-221520

(51) Int. Cl.
G02B 21/00 (2006.01)
G02B 7/04 (2006.01)
G02B 27/40 (2006.01)
G02B 27/64 (2006.01)

(52) U.S. Cl. ................... 359/383; 359/368; 250/201.3
(58) Field of Classification Search ................ 359/368, 359/382, 383; 250/201.3, 201.4
See application file for complete search history.

(56) References Cited

U.S. PATENT DOCUMENTS 5,932,872 A    8/1999  Price .................... 250/201.3
6,640,014 B1 * 10/2003  Price et al. .............. 382/255
2004/0114218 A1  6/2004  Karlsson et al. ........... 359/368

FOREIGN PATENT DOCUMENTS

JP    9-113810    5/1997
JP   11-271624   10/1999

* cited by examiner

Primary Examiner—Alessandro Amari
(74) Attorney, Agent, or Firm—Morgan, Lewis & Bokius LLP

(57) ABSTRACT

A microscope system according to the present invention comprises a stage on which a specimen is placed, an image forming optical system that forms an image of the specimen placed on the stage, an image-capturing device that captures the image of the specimen formed by the image forming optical system, a focused position detection device that detects a focused position for the specimen based upon the specimen image captured by the image-capturing device and a focused position storage device that stores in memory the focused position detected by the focused position detection device. The focused position detection device sets a search range centered around the focused position stored in memory at the focused position storage device and detects the focused position anew by causing the stage and the image forming optical system to move relative to each other over the search range thus set each time a focusing operation is executed.

5 Claims, 13 Drawing Sheets

MICROSCOPE SYSTEM

INCORPORATION BY REFERENCE

This is a divisional application of application Ser. No. 10/625,545, filed on Jul. 24, 2003, now U.S. Pat. No. 7,167,305 which is hereby incorporated by reference.

The disclosure of the following priority application is herein incorporated by reference:

Japanese Patent Application No. 2002-221520 filed Jul. 30, 2002

BACKGROUND OF THE INVENTION

1. Field of the Invention

The present invention relates to a microscope having an autofocus device.

2. Description of the Related Art

The autofocus devices employed in microscopes in the known art include image contrast-type autofocus devices (AF devices). Such an AF device moves a specimen stage along the up/down direction (z axis) while detecting the contrast of a captured image and sets the Z coordinate at which the largest contract value is achieved as the focused position. The AF device then moves the stage to the detected focused position and completes the focusing operation.

Generally speaking, the range over which high contrast is achieved is extremely small relative to the range along the Z axis over which the AF device moves the stage (the search range) in order to detect the contrast of the captured image. Since it takes a considerable length of time to move the stage over the search range, it is difficult to reduce the length of time to elapse following the AF operation start until the stage is moved to and stopped at the focused position. If, on the other hand, the search range is greatly reduced so as to reduce the length of time required for the AF operation, the focus range may not be contained within the search range, depending upon the specimen.

SUMMARY OF THE INVENTION

The present invention provides a microscope system having an AF device capable of quickly detecting a focused position.

A microscope system according to the present invention comprises a stage on which a specimen is placed; an image forming optical system that forms an image of the specimen placed on the stage; an image-capturing device that captures the image of the specimen formed by the image forming optical system; a focused position detection device that detects a focused position for the specimen based upon the specimen image captured by the image-capturing device; and a focused position storage device that stores in memory the focused position detected by the focused position detection device. The focused position detection device in this microscope system sets a search range centered around the focused position stored in memory at the focused position storage device and detects the focused position anew by causing the stage and the image forming optical system to move relative to each other over the search range thus set each time a focusing operation is executed.

It is preferable that the microscope system further comprises a reset operation detection device that detects a reset operation for resetting memory contents at the focused position storage device, and that the focused position detection device sets the search range based upon the same focused position stored in memory at the focused position storage device every time a focusing operation is executed until the reset operation is detected by the reset operation detection device.

The reset operation detection device may detect a removal of the specimen from the stage as the reset operation. The microscope system may further include a housing in which at least the stage, the image forming optical system and the image-capturing device are housed, with the stage including a specimen platform on which the specimen is placed and a transfer unit that inserts the specimen platform into the housing and ejects the specimen platform from the housing via an opening formed at the housing. In this case, the reset operation detection device detects an eject operation through which the specimen platform is ejected from the housing as the reset operation.

It is preferable that if the focused position is not stored in memory at the focused position storage device when a focusing operation is executed, the focused position detection device detects the focused position over an initial search range set wider than the search range. The microscope system may further comprise an initial position storage device that stores in memory an initial position of the stage which is obtained when the specimen is brought to be placed on the stage, and the focused position detection device may move the stage to the initial position stored in memory at the initial position storage device if the focused position cannot be detected over the initial search range. If the focused position cannot be detected anew over the search range that has been set, the focused position detection device may move the stage to the focused position having been stored in memory at the focused position storage device.

It is preferable that the focused position detection device erases the memory contents at the focused position storage device once the reset operation is detected by the reset operation detection device.

The microscope system may further comprises a slide glass detection device that detects a replacement operation for replacing a slide glass used to hold the specimen; an identification information detection device that detects identification information inherent to the slide glass and provided at the slide glass; an identification information storage device that stores in memory the identification information detected by the identification information detection device; and a control device that (1) stores the identification information on the slide glass detected by the identification information detection device and the focused position detected by the focused position detection device in correspondence to each other into the identification information storage device if a removal operation for removing the slide glass is detected based upon a detection signal provided by the slide glass detection device and (2) reads out the focused position corresponding to the identification information on the slide glass detected by the identification information detection device from the identification information storage device and stores the focused position thus read out into the focused position storage device if a mounting operation for mounting the slide glass is detected based upon the detection signal provided by the slide glass detection device.

It is desirable to further comprise a contrast detection device that detects a contrast value of the image captured by the image-capturing device, and that the focused position detection device detects the focused position for the specimen based upon the contrast value detected by the contrast detection device.

An autofocus device according to the present invention comprises a connection unit that connects with an image-capturing device, the image-capturing device capturing an image of a specimen placed on a stage in a microscope, which is formed via an image-forming optical system, and determining a contrast value of the captured image; a focused position detection device that detects a focused position for the specimen based upon the contrast value obtained via the connection unit; a storage device that stores in memory the focused position detected by the focused position detection device; and a reset operation detection device that detects a reset operation for resetting memory contents at the storage device. The focused position detection device (1) sets a search range centered around the focused position stored in memory at the storage unit and outputs a command for detecting the focused position anew by moving the stage along an optical axis of the image forming optical system over the search range thus set and (2) erases the stored contents at the storage device once the reset operation is detected by the reset operation detection device.

A microscope system according to the present invention comprises a focused position detection device that detects a focused position for a specimen; a focused position storage device that stores in memory information related to the focused position detected by the focused position detection device; a search device that determines a search range based upon the focused position information stored in memory at the focused position storage device and controls the focused position detection device so as to perform a focused position detection operation within the search range; a reset device that resets the focused position information stored in memory at the focused position storage device; and a control device that holds the focused position information in the focused position storage device once the focused position information is stored into the focused position storage device until the reset device is engaged in operation.

It is preferable that the microscope system further comprises a slide glass detection device that detects a replacement operation for replacing a slide glass used to hold the specimen; an identification information detection device that detects identification information inherent to the slide glass and provided at the slide glass; and an identification information storage device that stores in memory the identification information detected by the identification information detection device. In this case, if the slide glass detection device detects a removal operation for removing the slide glass, (1) the control device stores the identification information on the slide glass detected by the identification information detection device and the focused position information detected by the focused position detection device in correspondence to each other into the identification information storage device and (2) the reset device resets the focused position information in the focused position storage device. If, on the other hand, the slide glass detection device detects a mounting operation for mounting the slide glass, the control device reads out the focused position information corresponding to the identification information on the slide glass detected by the identification information detection device from the identification information storage device and stores the focused position information thus read out into the focused position storage device.

In an autofocus control method adopted in a microscope according to the present invention, an image of a specimen placed on a slide glass mounted on a stage is captured; a focused position for the specimen relative to an objective lens is detected by using the captured image of the specimen; the focused position is stored into memory at a storage device; and the focused position is detected anew by moving the stage and the objective lens relative to each other within a search range centered around the focused position stored in the storage device when an instruction for a focusing operation start is issued. In this case, it is preferable that information indicating the focused position stored in the storage device is erased once the slide glass is moved off an optical axis of the objective lens.

DESCRIPTION OF THE PREFERRED EMBODIMENT

First Embodiment

The microscope system achieved in the first embodiment of the present invention is now explained in reference to FIGS. 1 to 7.

Figure 1:
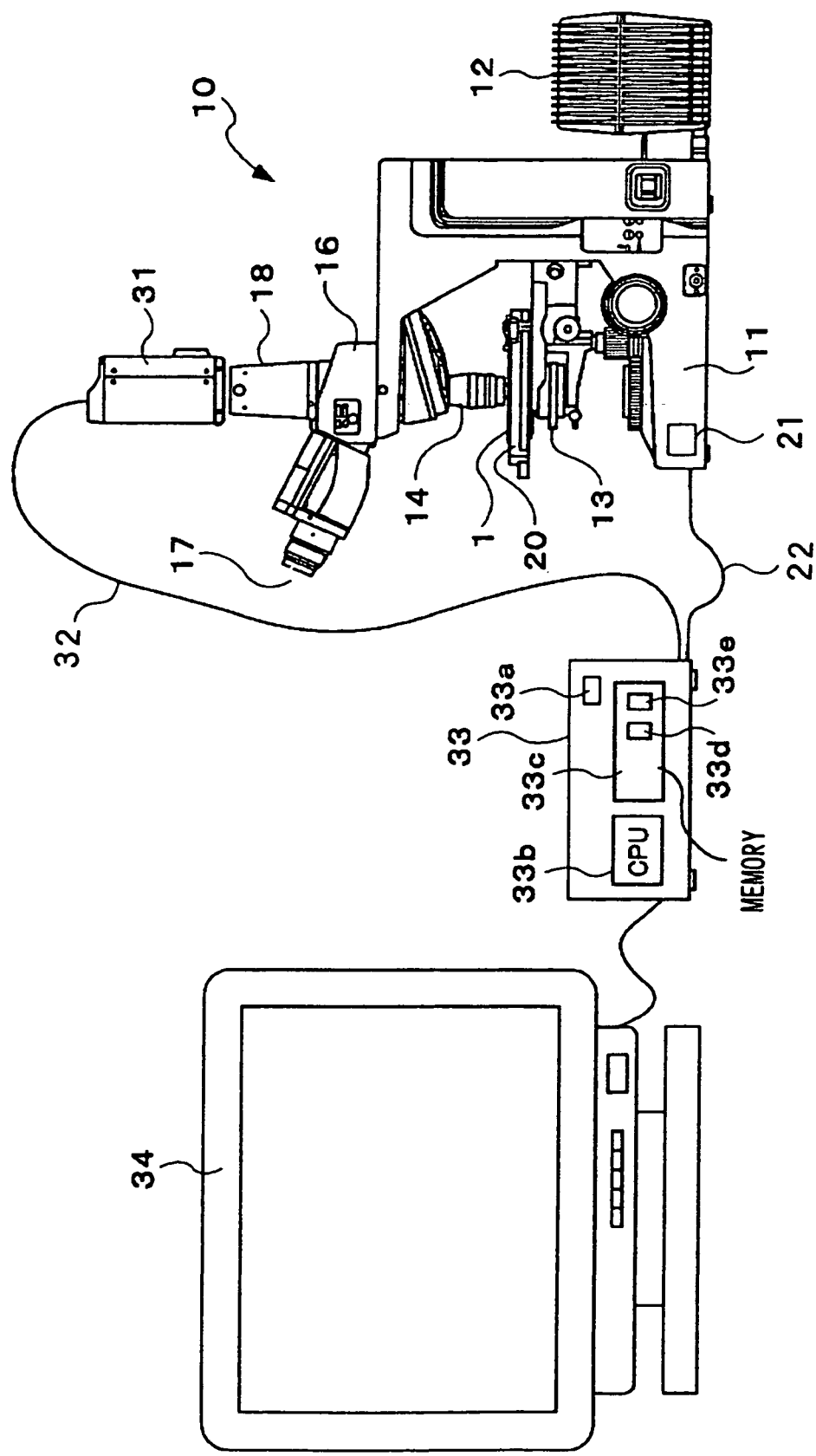
FIG. 1 shows the overall structure adopted in a microscope system having an AF device in a first embodiment of the present invention.

As shown in FIG. 1, the microscope system in the first embodiment comprises a microscope 10 and an autofocus (AF) device. The AF device includes a camera head 31 connected with the microscope 10, an image processing unit 33 and a video monitor 34. The microscope 10 includes a stage 20 on which a specimen is placed, an objective lens 14, a lens barrel 16, an eyepiece lens 17, an upright barrel 18, a light source 12, a condenser lens 13 and a main body of 11 supporting the members listed above. It is to be noted that the objective lens 14, the lens barrel 16 and the upright barrel 18 constitute an image forming optical system that forms an image of the specimen placed on the stage 20, whereas the objective lens 14, the lens barrel 16 and the eyepiece lens 17 constitute an observation optical system that enables a user to directly observe the specimen.

The camera head 31 of the AF device is attached to the upright barrel 18. In addition, a stage drive unit 21 that causes the stage 20 to move along the optical axis of the objective lens 14, i.e., along the vertical direction (along a z axis), is disposed in the main body 11. The stage drive unit 21, which includes a motor for driving the stage 20 and a mechanical unit, is connected to the image processing unit 33 via a signal line 22. While the AF device is engaged in operation, the stage drive unit 21 controls the drive of the motor in conformance to a signal output from the image processing unit 33. The AF device searches for a focused position or a focus-match position by causing the stage 20 to move along the z axis through motor drive.

Figure 3:
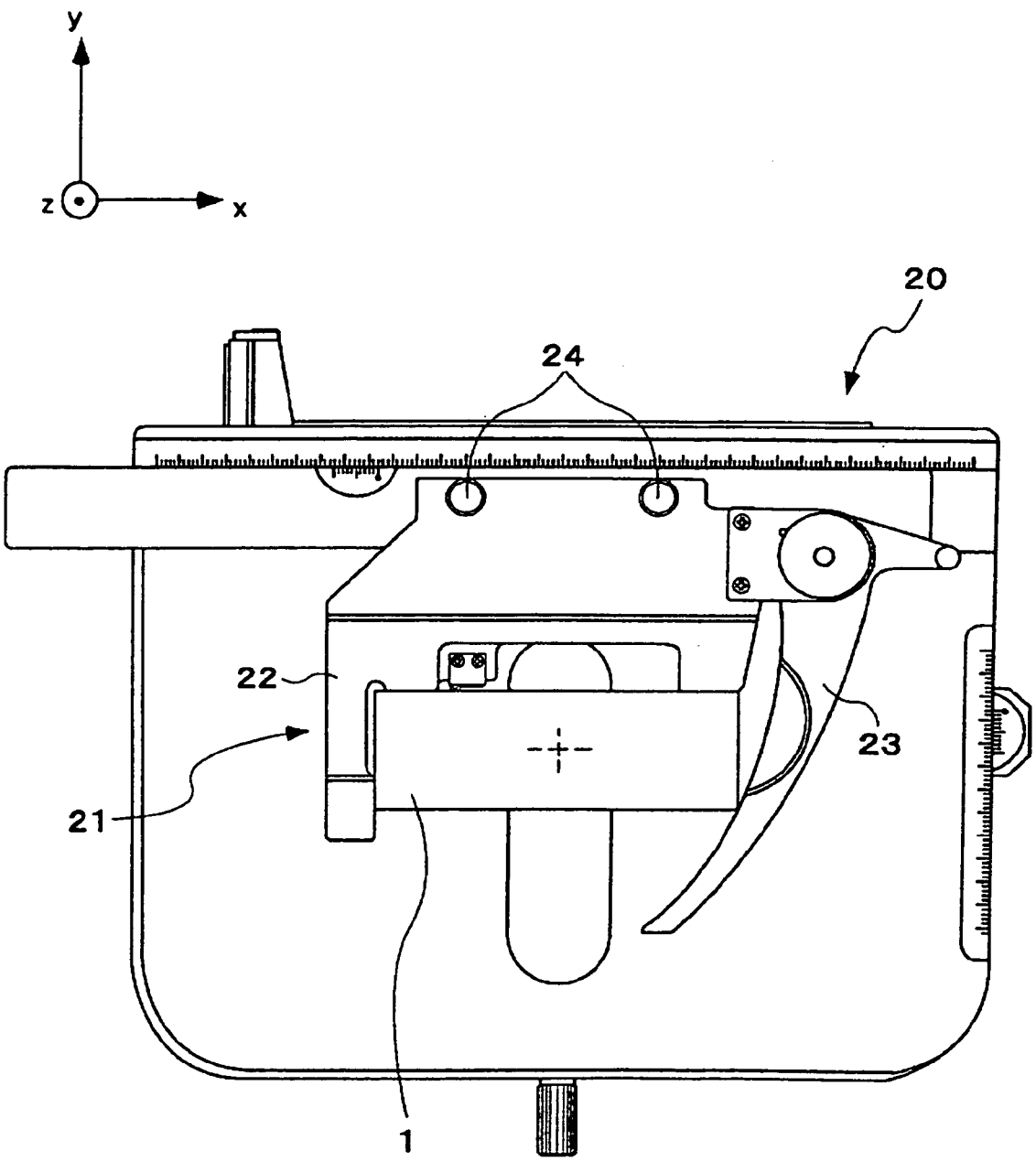
FIG. 3 is a top view of a stage included in the microscope system shown in FIG. 1.

As shown in FIG. 3, a specimen holder 21 is fixed to the stage 20 with two clamp screws 24. The stage 20 includes mechanisms that move the specimen holder 21 along an x direction and a y direction individually.

Figure 4:
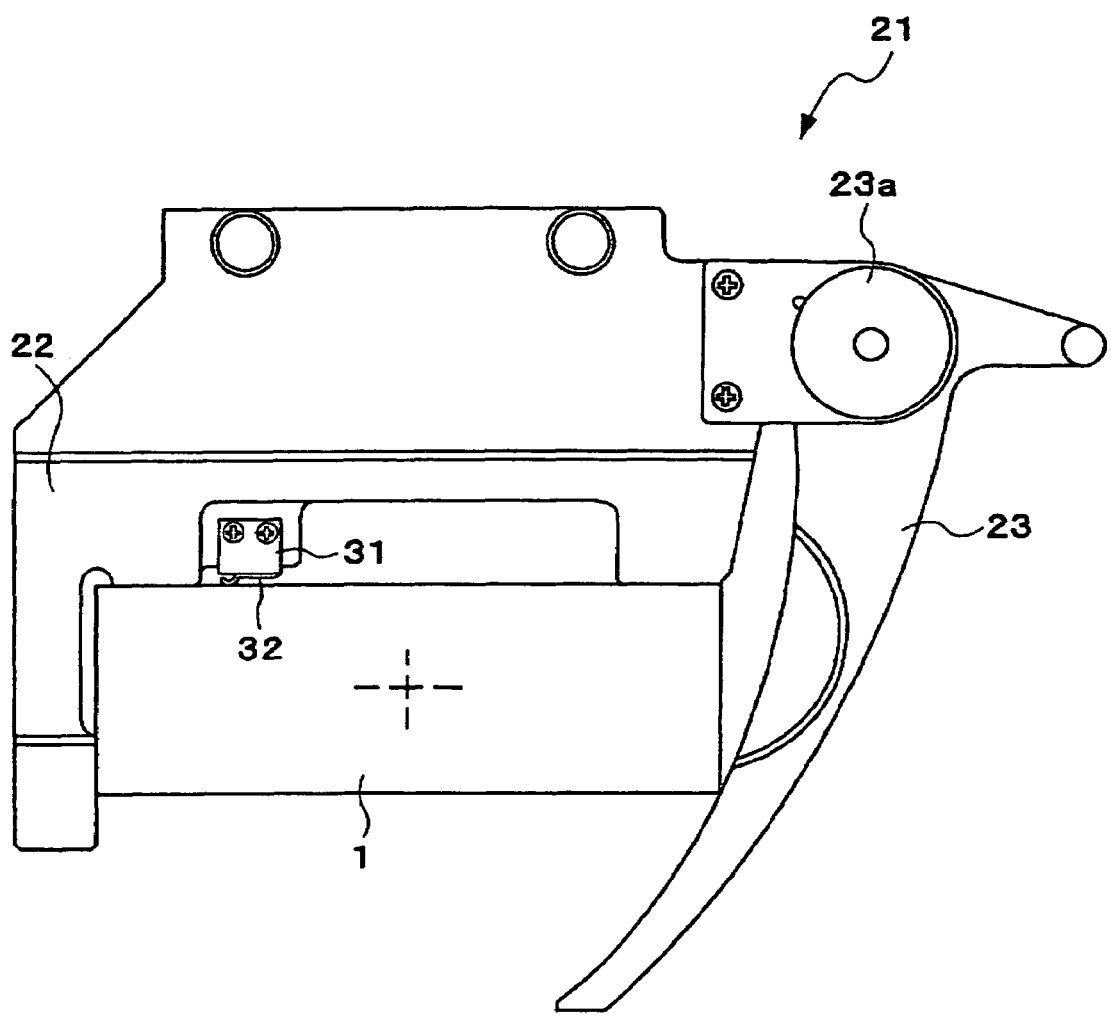
FIG. 4 is a top view of a specimen holder holding a slide glass at the stage shown in FIG. 3.
Figure 5:
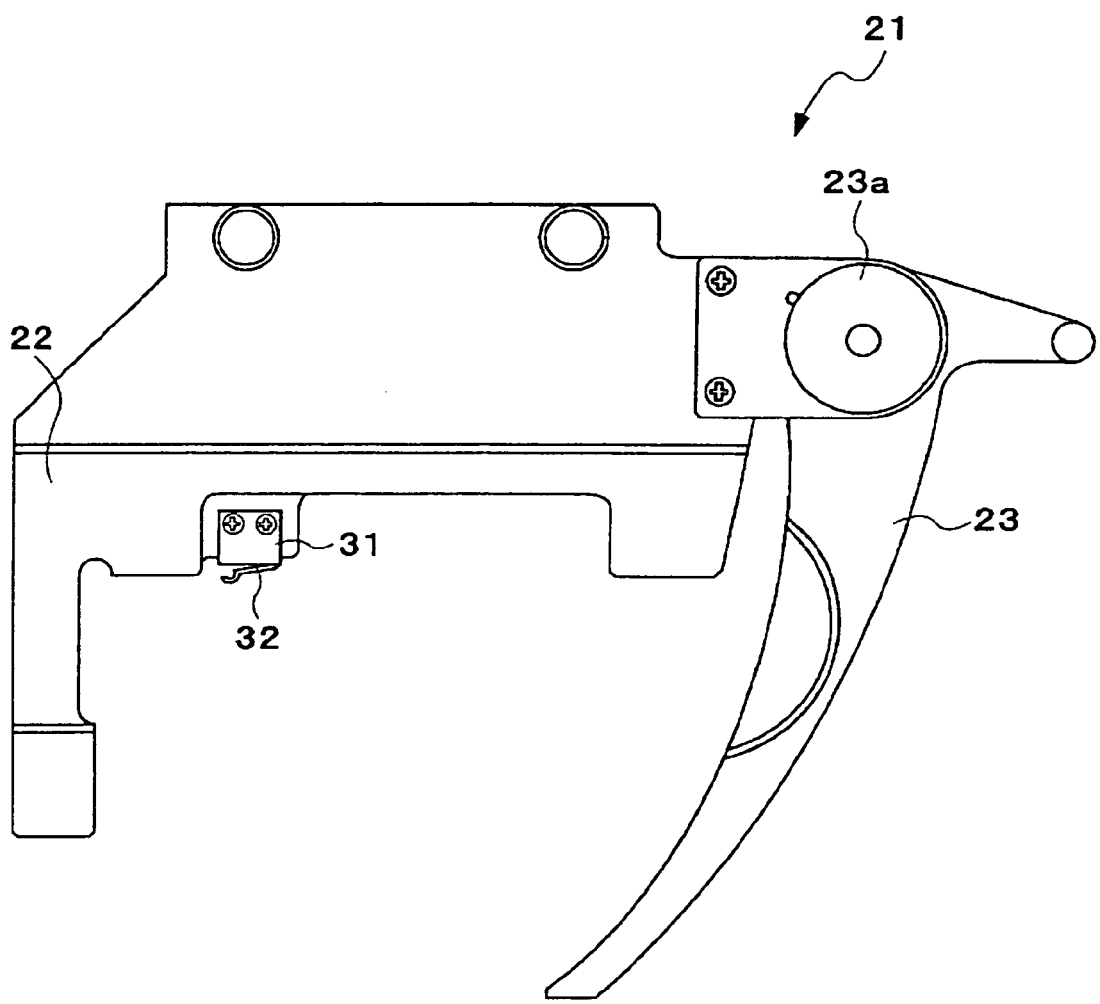
FIG. 5 is a top view of the specimen holder without a slide glass at the stage shown in FIG. 3.

As shown in FIGS. 4 and 5, the specimen holder 21 includes a fixed claw 22 and a movable claw 23. The specimen holder 21 holds a slide glass 1 having a specimen as a test piece placed thereupon by clamping the slide glass 1 between the movable claw 23 to which a force is applied with a spring mechanism 23a and the fixed claw 22. A microswitch 31 having a detection lever 32 is firmly attached to the fixed claw 22. The microswitch 31 is capable of detecting whether or not the slide glass 1 is currently held at the specimen holder 21 by detecting whether the detection lever 32 is pressed down under the slide glass 1, as shown in FIG. 4, or the detection lever 32 having been released is at an erect position, as shown in FIG. 5.

When observing a specimen or a test piece placed between the slide glass 1 and a cover glass and held by the specimen holder 21 on the stage 20 in the microscope system described above, light emitted from the light source 12 is condensed at the condenser lens 13 and is then irradiated onto the specimen on the slide glass 1. Light reflected off the specimen travels through the image forming optical system constituted of the objective lens 14, the lens barrel 16, the upright barrel 18 and the like and forms an optical image at an image-capturing surface of a CCD (not shown) provided inside the camera head 31. The optical image of the specimen is converted to an image signal at the CCD, and the image signal is then provided to the image processing unit 33 via a signal line 32. The image processing unit 33 displays the image as a visual image at the monitor 34. In addition, the user is allowed to directly observe the specimen image through the eyepiece lens 17.

Figure 2:
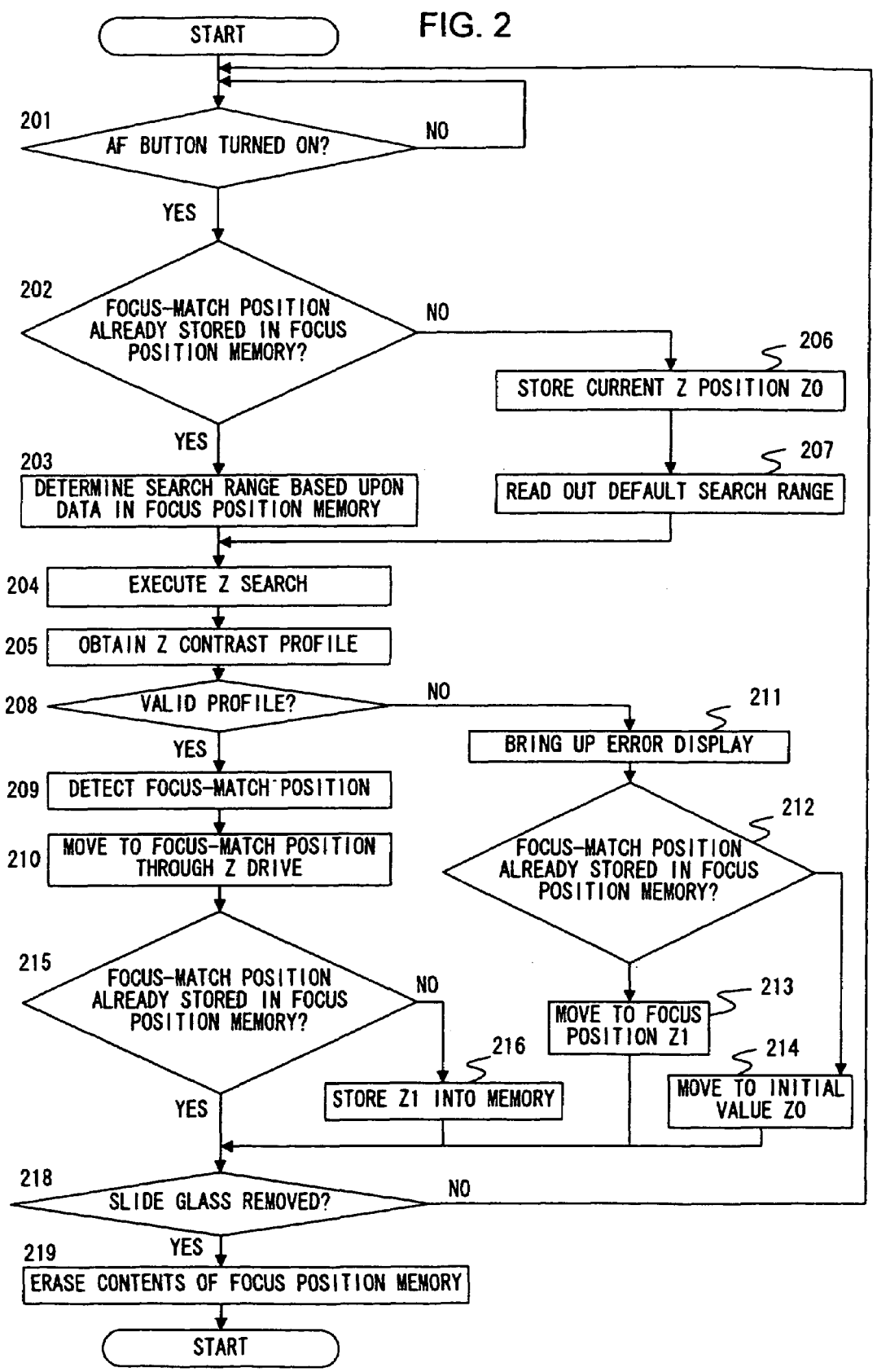
FIG. 2 presents a flowchart of the AF operation processing executed in the microscope system shown in FIG. 1.
Figure 6:
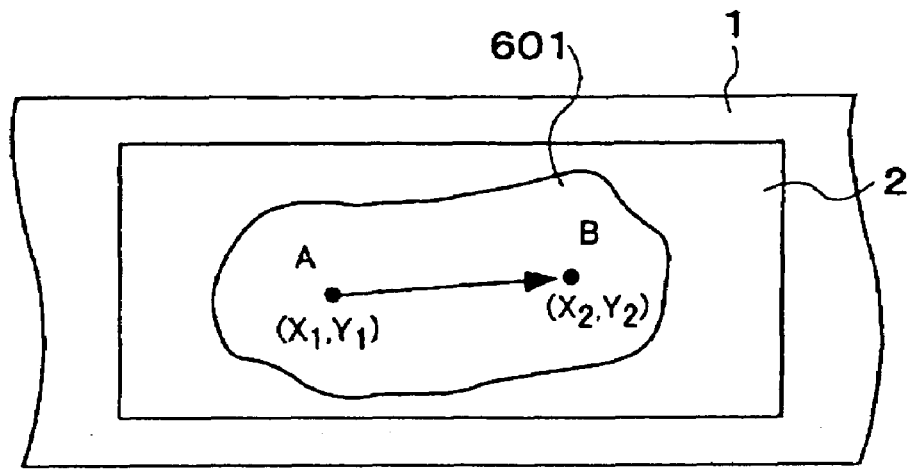
FIG. 6 shows a specimen placed on the slide glass.
Figure 7:
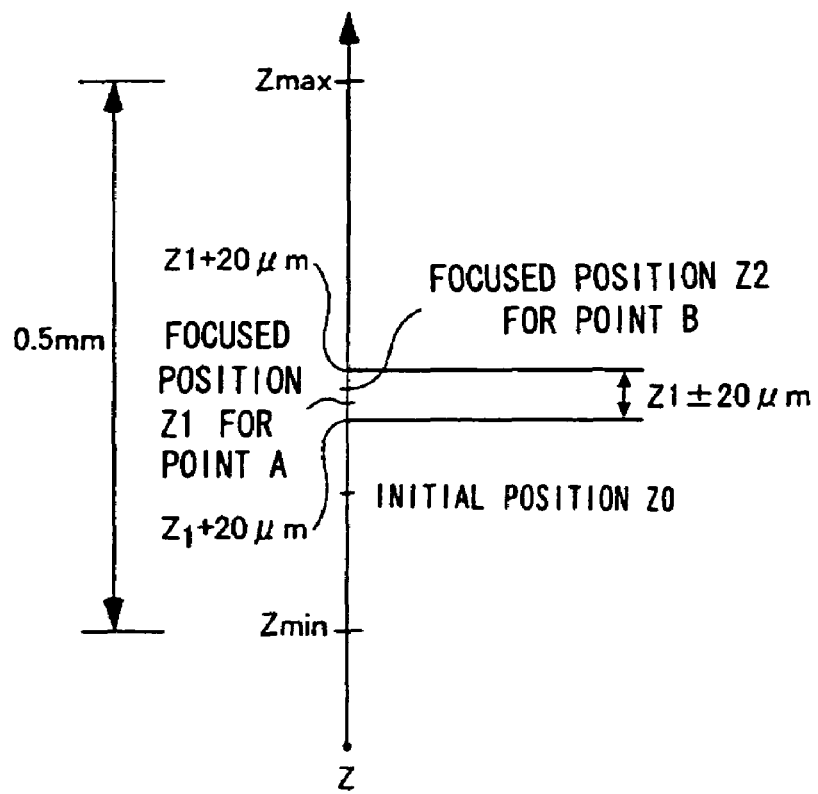
FIG. 7 shows the search range of the stage extending along the Z direction, which is set for an AF operation.

The following is an explanation of the focusing operation executed by the AF device, given in reference to FIGS. 2, 6 and 7.

First, the image contrast-type AF operation executed at the AF device is briefly explained. An image contrast-type AF device moves the stage 20 along the Z axis while detecting the contrast of the captured specimen image and sets the Z coordinate at which the contrast value of the captured image reaches its highest as the focused position.

Figure 14:
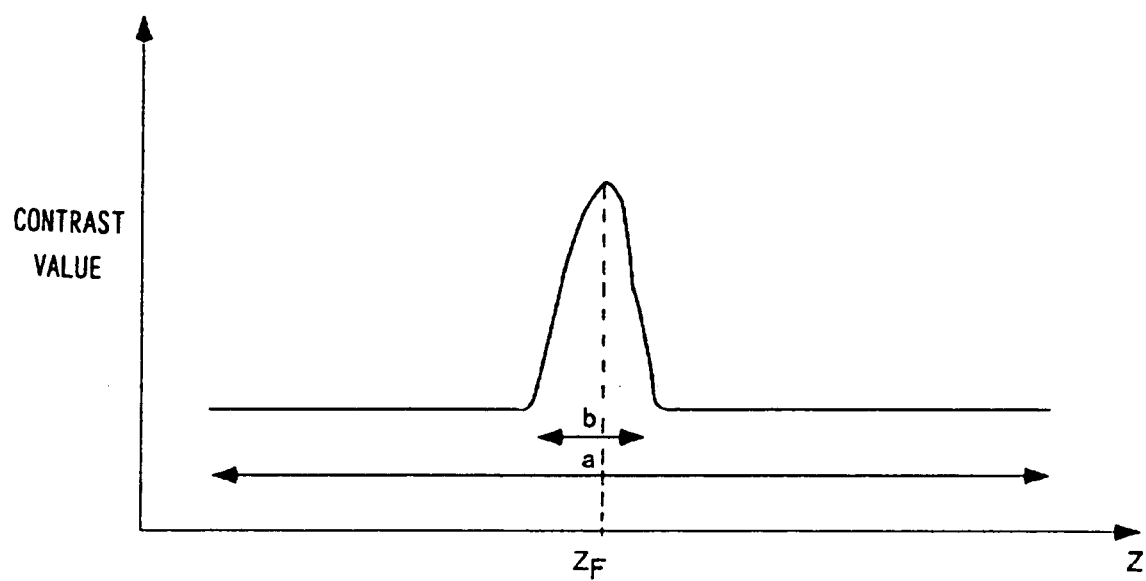
FIG. 14 presents an example of the relationship between the contrast value obtained when executing an AF operation with an image contrast AF device and the Z coordinate of the stage.

The AF device profiles the contrast of the captured image that is detected while moving the stage 20 along, for instance, the +direction of the z axis. FIG. 14 shows a relationship between the stage position along the z axis and the contrast value. The AF device ascertains the Z coordinate Zf at which the contrast value is at its highest by using a profile with a peak such as that shown in FIG. 14. Then, the AF device moves the stage 20 along the −direction of the z axis to the calculated coordinate Zf. The stage 20 is thus positioned at the coordinate Zf at the focused position, thereby completing the focusing operation.

The image processing unit 33 includes an internal CPU 33b and an internal memory 33c. The CPU 33b has a contrast detection function and an AF function. More specifically, the CPU 33b processes an image taken into the camera head 31 and detects the contrast in the image by executing a contrast detection program read from the memory 33c where the program is pre-installed. In addition, the CPU 33b executes an AF control program read from the memory 33c where the control program is pre-installed and thus executes an AF operation by moving the stage 20 ultimately to the focused position.

At a casing of the image processing unit 33, an AF button 33a at which an AF operation start instruction issued by the user is received is provided. An area used to store the z coordinate of the focused position (hereafter referred to as a focus position memory 33d) and an area for storing the z coordinate assumed before the AF operation start (hereafter referred to as an initial value memory 33e) are provided inside the memory 33c.

Now, the AF operation executed at the AF device is explained in reference to the flowchart presented in FIG. 2. First, the user moves the specimen along the x axis and also along the y axis by operating an X drive mechanism and a Y drive mechanism (not shown) for the stage 20. The explanation is given on an assumption that the observation is started in a state in which a point A (X 1, Y 1) of a specimen 601 placed between the slide glass 1 and the cover glass 2 as shown in FIG. 6 is set to face opposite the objective lens 14. It is to be noted that a focus-match has not been achieved at the point A relative to the objective lens 14 and the z coordinate of the point A is at Z0 at this time. The z coordinate Z0 at this point in time is designated as an initial position of the stage 20, as shown in FIG. 7.

In step S201, the CPU 33b makes a decision as to whether or not the AF button 33a has been turned on. If the user has issued an instruction for an AF operation start by pressing down the AF button 33a, the operation proceeds to step S202. In step S202, the CPU 33b makes a decision as to whether or not the z coordinate of the focused position has already been stored into the focus position memory 33d. If the Z coordinate of the focused position is not yet stored in the memory, the operation proceeds to step S206. In step S206, the current Z coordinate Z0 of the point A is stored as an initial value into the initial value memory 33e and then the operation proceeds to step S207.

In step S207, a search range is set. The search range refers to a range over which the stage 20 is caused to move along the z axis in order to detect the contrast of the captured image of the specimen 601. In this example, preset z coordinates Zmin and Zmax are read out from the memory 33c in order to set the search range. The coordinate Zmin and the coordinate Zmax are absolute coordinates that are set in advance within the range over which the stage 20 is allowed to move. The distance between the coordinate Zmin and the coordinate Zmax may be set at, for instance, 0.50 mm by taking into consideration that the standard thickness of the slide glass 1 is 0.9 mm to 1.2 mm. After setting the search range, the operation proceeds to step S204.

In step 204, the CPU 33b outputs a control signal to the stage drive unit 21 and causes the stage 20 to move over the search range having been set, i.e., over the range extending from the coordinate Zmin to the coordinate Zmax. In step S205, the CPU 33b detects the contrast of the image taken into the camera head 31 at predetermined sampling intervals while the stage 20 travels from the coordinate Zmin to the coordinate Zmax. The CPU 33*b* then profiles the relationship between the detected contrast value and the Z coordinate of the stage 20.

In the following step S208, the CPU 33*b* makes a decision as to whether or not the profile obtained in step S205 is valid. More specifically, it makes a decision as to whether or not the profile includes a peak indicating a high contrast value, as shown in FIG. 14, i.e., whether or not a focused position is contained in the search range. If the profile contains a peak, the operation proceeds to step S209.

In step S209, the z coordinate Zf=Z1 at the peak point of the contrast is ascertained and the coordinate Z1 is designated as the focused position for the point A. In step S210, the CPU 33*b* outputs a control signal to the stage drive unit 21 so as to move the stage 20 to the coordinate Z1 of the detected focused position. Driven by the motor at the stage drive unit 21, the stage 20 travels to the coordinate Z1 of the focused position and then stops. Thus, the user is able to observe the specimen 601 in a state in which the objective lens 14 is focused on the point A of the specimen 301.

In step S215, the CPU 33*b* makes a decision as to whether or not data indicating the Z coordinate of the focused position are already stored in the focus position memory 33*d*. Since the z coordinate data have not yet been stored into the focus position memory 33*d* in this example, a negative decision is made in step S215 and the operation proceeds to step S216. In step S216, the CPU 33*b* stores the data indicating the coordinate Z1 of the focused position detected in step S209 into the focus position memory 33*d*.

Next, the CPU 33*b* makes a decision in step S218 as to whether or not the slide glass 1 is mounted at the specimen holder 21 based upon a signal provided by the microswitch 31. If the slide glass 1 is mounted at the specimen holder 21, it judges that the observation is being continuously conducted with the same specimen, and thus, the operation returns to step S201.

Next, an explanation is given on a case in which the AF operation is executed again while the slide glass 1 is held at the specimen holder 21. For instance, when the AF operation is to be executed at a point B after the user shifts the observation position from the point A (X1, Y1) to the point B (X2, Y2) as shown in FIG. 6 or when the AF operation is to be executed for the point A again after the user moves the stage 20 along the z direction, the user presses the AF button 33*a* again.

After an ON state of the AF button 33*a* is detected in step S201, the CPU 33*b* makes a decision in step S202 as to whether or not the Z coordinate of the focused position is already stored in the focus position memory 33*d*. Since the coordinate Z1 was stored in memory in the focus position memory 33*d* in step S216 explained earlier, the operation proceeds to step S203. In step S203, the coordinate Z1 stored in the focus position memory 33*d* is read out and a search range is determined by setting a range extending over a predetermined distance and centered around the coordinate Z1 having been read out. In more specific terms, a range extending from, for instance, a coordinate (Z1−20 μm) to a coordinate (Z1+20 μm) obtained by adding predetermined values, e.g., ±20 μm, to the coordinate Z1 stored in the focus position memory 33*d* is set as the search range. It is to be noted that the search range set in step S203 is a narrow range that is equal to or smaller than one-tenth of the search range (0.5 mm) set in step S207 when no focused position is stored in the focus position memory 33*d*.

Next, in step S204, the stage 20 is caused to move over the search range (Z1±20 μm) set in step S203. In step S205, the contrast of the captured image in the search range is detected and its profile is obtained. If it is decided in step S208 that the profile contains a peak, the Z coordinate of the peak of the contrast value is detected and thus the coordinate Z2 of the new focused position is ascertained in step S209. In step S210, the stage 20 is caused to move to and stop at the coordinate Z2 of the focused position determined in step S209. As a result, the user is able to observe the desired observation point of the specimen 601 in a focus-matched state.

It is to be noted that since the coordinate Z1 of the focused position for the point A is already stored in the focus position memory 33*d* in this case, an affirmative decision is made in step S215 and the operation proceeds to step S218 without storing the newly set coordinate Z2. A negative decision is made in step S218 unless the slide glass 1 has been disengaged from the specimen holder 21. Accordingly, it is judged that the observation is being continuously conducted by using the same sample and the operation returns to step S201.

If, on the other hand, a negative decision is made in step S208, i.e., if a valid profile with a peak has not been obtained from the contrast of the captured image, the operation proceeds to step S211. In such a case, an area on the slide glass 1 where the specimen is not present is likely to be under observation through the objective lens 14. Accordingly, the CPU 33*b* brings up an error display indicating that no specimen is present on the optical axis of the objective lens 14 at the monitor 34 in step S211.

Subsequently, the CPU 33*b* makes a decision in step S212 as to whether or not the coordinate of the focused position is stored in the focus position memory 33*d*. If an affirmative decision is made in step S212, i.e., if the coordinate Z1 of the focused position is stored in the memory 33*d*, the operation proceeds to step S213. In step S213, the coordinate Z1 of the focused position is read out and the stage 20 is caused to move to the coordinate Z1. If, on the other hand, a negative decision is made in step S212, i.e., if the coordinate of the focused position is not stored in the focus position memory 33*d*, the operation proceeds to step S214. In step S214, the initial coordinate Z0 of the stage 20 stored in the initial value memory 33*e* is read out and the stage 20 is caused to travel to the initial coordinate Z0. Thus, even when a valid profile has not been obtained, the stage 20 can be reset to the coordinate Z1 of the preceding focused position ascertained for the same specimen or at the initial position Z0.

It is to be noted that if an affirmative decision is made in step S218, i.e., if it is detected that the slide glass 1 has been disengaged from the specimen holder 21, the operation proceeds to step S219. Since the coordinate Z1 of the focused position and the initial value Z0 respectively stored in the memories 33*d* and 33*e* cannot be used for a different specimen, the CPU 33*b* erases all the data in the focus position memory 33*d* and the initial value memory 33*c* in step S219.

As explained above, if the coordinate of a focused position is already stored in the focus position memory 33*d*, the search range over which a focused position is searched can be reduced. Namely, the presence of data indicating the coordinate of a focused position already stored in the memory 33*d* indicates that the slide glass 1 has not been replaced and the AF operation is to be executed again for the same specimen 601. Accordingly, since only the displacement of the focused position attributable to the inconsistent thickness of the specimen 601 needs to be taken into consideration, anew search range which is much smaller than the preset initial search range can be set. As a result, a second and subsequent AF operations to be executed in conjunction with a given sample can be quickly executed.

It is to be noted that while the initial search range defined by the absolute coordinates Zmin and Zmax extends over 0.5 mm and the search range set for the second and subsequent searches executed for the same specimen extends over ±20 µm relative to the coordinate Z1 of the first focused position in the explanation provided above, the present invention is not limited to these specific numerical values. For instance, the search range may be determined by taking into consideration the stroke of the stage 20 along the z axis or by taking into consideration typical inconsistency in the thickness of specimens that the user normally uses. It is to be noted that values indicating the subsequent search range (±20 µm in this example) may be entered by the user.

As described above, in the microscope system achieved in the first embodiment, the coordinate Z1 of the focused position detected through the first AF operation executed for a given specimen is stored into the focus position memory 33d. If the user moves the X coordinate and Y coordinate without replacing the specimen or if the user moves the Z coordinate of the specimen without changing the X and Y coordinates, a new search range is set to center around the coordinate Z1 of the focused position stored in the memory 33d. The new search range is set sufficiently narrower than the initial search range. Since the contrast is detected within the newly set narrow search range during a subsequent AF operation executed on the same specimen, the focused position can be detected quickly. In addition, even when the user issues an instruction for an AF operation start on an area of the slide glass 1 where no specimen is present, the stage 20 can be reset to the coordinate Z1 of the first focused position or to the initial coordinate Z0.

If the specimen is replaced with another specimen, the data stored in the focus position memory 33d and the initial value memory 33e are erased, and thus, the Z coordinate of the focused position can be reset for each specimen.

In the first embodiment described above, the coordinate Z1 of the focused position detected through the first AF operation is continuously held in the focus position memory 33d until the specimen is replaced. However, the Z coordinate stored in the focus position memory 33d may be updated every time the AF operation is executed. More specifically, if an affirmative decision is made in step S215 in the flowchart presented in FIG. 2, the coordinate of the focused position detected through the most recent AF operation, e.g., the coordinate Z2 of the second focused position, is stored into the focus position memory 33d, thereby upgrading the Z coordinate of the focused position. Then, the operation proceeds to step S218.

Second Embodiment

Figure 8:
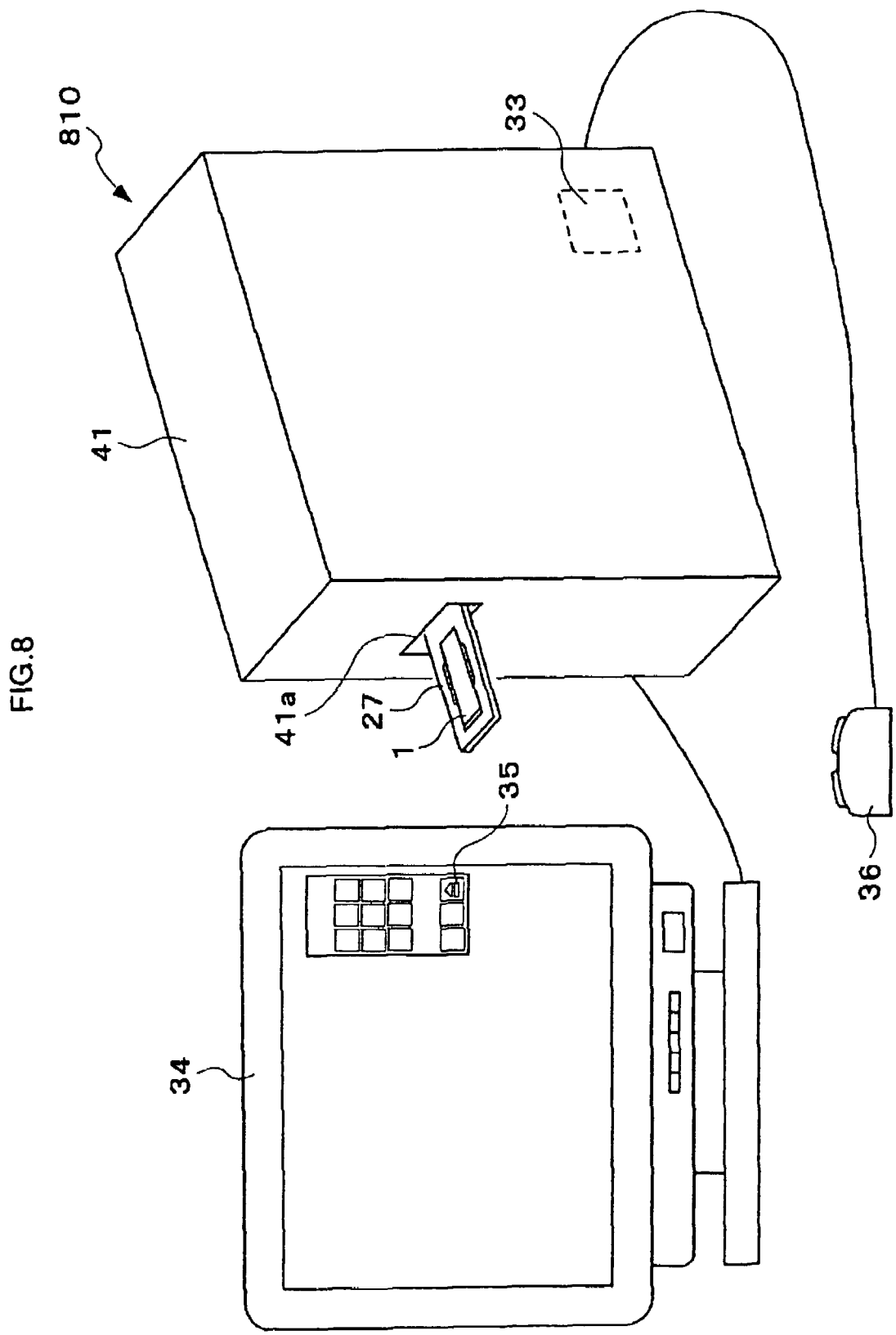
FIG. 8 shows the overall structure adopted in a microscope system having an AF device in a second embodiment of the present invention.
Figure 9:
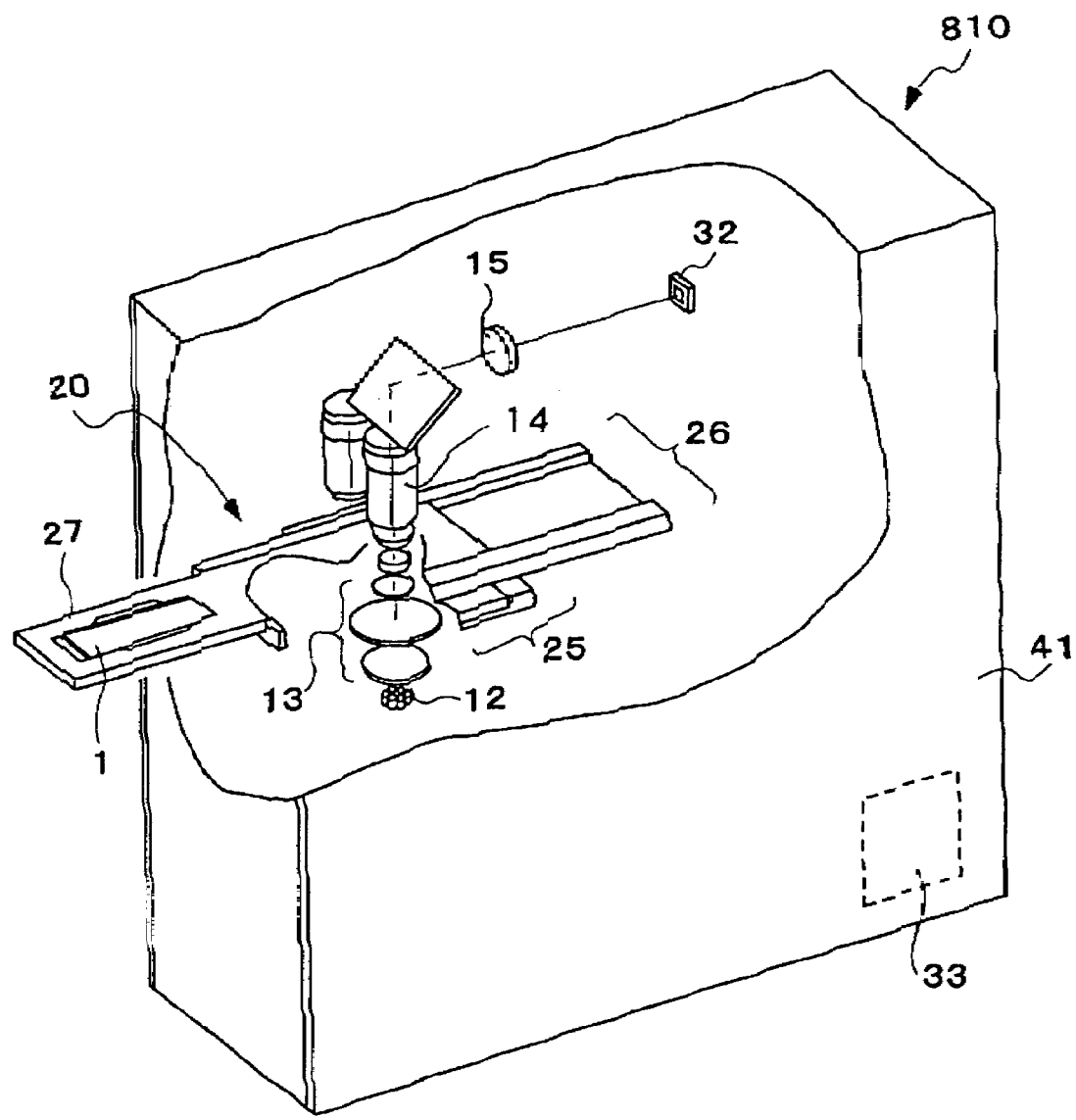
FIG. 9 is a cutaway perspective, showing the internal structure of the microscope in FIG. 8.

Next, the microscope system achieved in the second embodiment of the present invention is explained in reference to FIGS. 8 and 9.

As shown in FIGS. 8 and 9, in a microscope system 810 achieved in the second embodiment, all the components of the microscope, i.e., the light source 12, the condenser lens 13, the stage 20 and optical systems such as the objective lens 14 and a second objective lens 15 and the drive mechanism for the stage 20 are housed inside a box-shaped housing 41. In addition, the microscope system 810 does not have any eyepiece lens 17 and includes an internal image-capturing element 32. An image signal of a specimen obtained by the image-capturing element 32 is processed at the image processing unit 33 disposed inside the housing 41.

The microscope system 810 adopts a structure that allows the specimen image having been processed at the image processing unit 33 to be displayed at the monitor 34. The drive mechanisms employed to move the stage 20, to execute a focusing operation, to switch the magnification factor and the like are all electrically driven. The user issues instructions for these operations by operating a control pad 36 which is included in the microscope system. In particular, the user is allowed to issue an instruction for an AF operation start by operating the control pad 36.

The stage 20 assumes a structure achieved by setting a cross roller guide 26 which moves along the x axis over a cross roller guide 25 which moves along the y axis. The stage 20 includes a stepping motor (not shown) and a lead screw (not shown) provided in conjunction with each of the cross roller guides 25 and 26. A specimen platform 27 is mounted on the cross roller guide 26 that moves along the x axis. The specimen platform 27 can be electrically driven along the x axis and the y axis via the cross roller guides 25 and 26. In addition, the y-axis cross roller guide 25 is mounted at a z axis drive mechanism and can be driven along the z axis by a motor as well.

At the specimen platform 27, a rectangular opening at which the slide glass 1 is held is formed. The stage 20 is allowed to move over a larger range along the x axis. As a result, the entire slide glass holding portion of the specimen platform 27 can be moved from a slit opening 41a at the housing 41 to the outside of the housing 41. As the user clicks a loading button 35 brought up on display at the monitor 34 with the control pad 36 included in the microscope system, the specimen platform 27 can be loaded through the opening 41a (the specimen platform 27 can be taken into the housing 41 from the outside) or unloaded through the opening 41a (the specimen platform 27 can be ejected to the outside from the housing 41).

The operation executed at the image processing unit 33 is almost identical to that executed by the image processing device explained in reference to the first embodiment. However, it is judged in the second embodiment that the specimen has been replaced when an operation to load or unload the specimen platform 27 is performed. More specifically, in order to judge in step S218 in the flowchart in FIG. 2 as to whether or not the slide glass 1 has been disengaged as explained in reference to the first embodiment, the CPU 33b makes a decision as to whether or not the user has performed an operation to unload the specimen platform 27. If the user has operated the control pad 36 to issue an instruction for an unload operation, the operation proceeds to step S219 to erase the data in the focus position memory 33d. Thus, operational effects similar to those achieved in the first embodiment are realized.

It is to be noted that the microscope system in the second embodiment may include a detection unit similar to that provided in the first embodiment so as to enable a detection as to whether or not the slide glass 1 is mounted on the specimen platform 27. In such a case, the CPU 33b makes a decision in step S218 in FIG. 2 as to whether or not the slide glass 1 has been removed based upon the detection results of the detection unit.

Third Embodiment

The microscope system achieved in the third embodiment of the present invention is now explained in reference to FIGS. 10 to 13.

Figure 10:
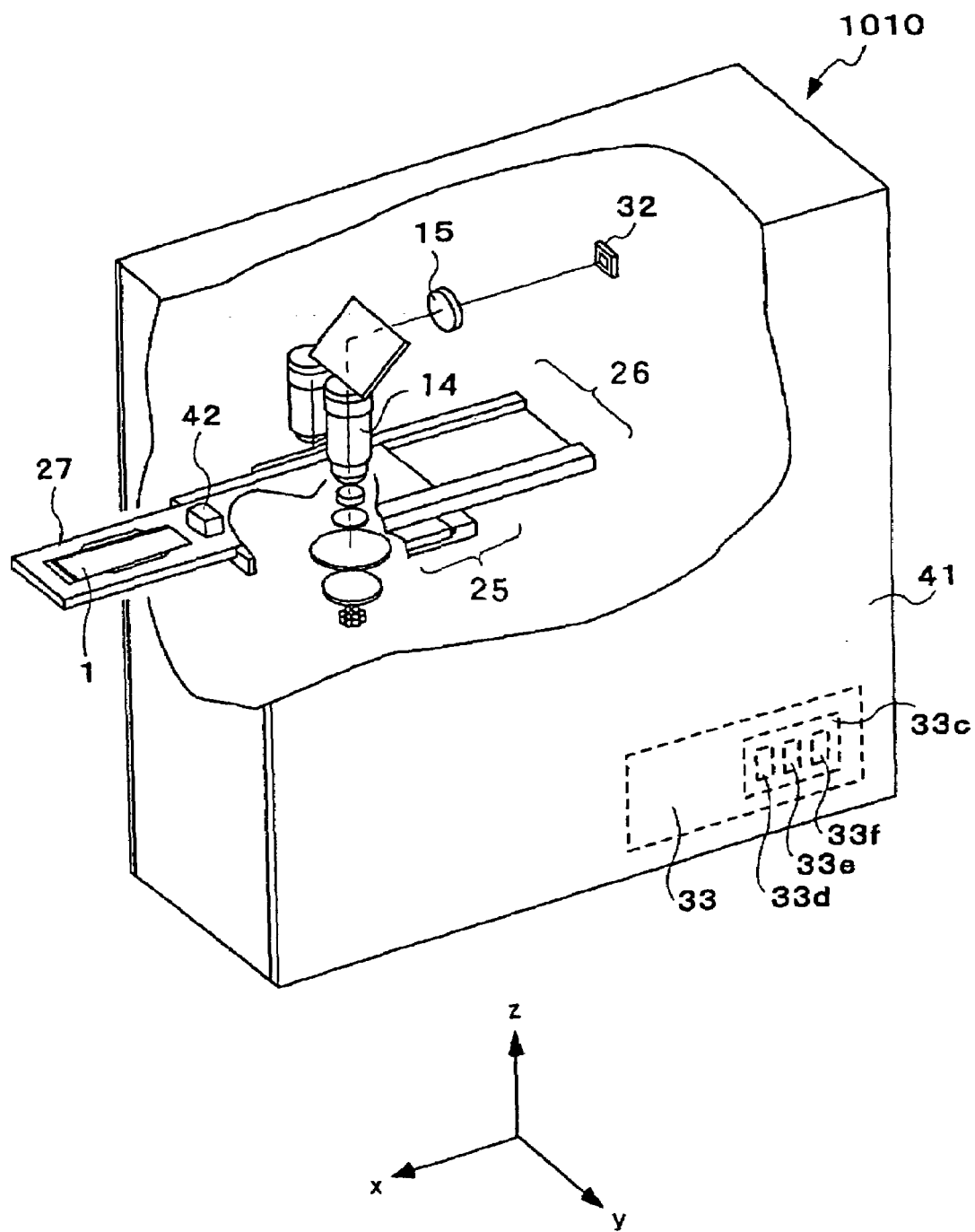
FIG. 10 is a cutaway perspective of a microscope system having an AF device, achieved in a third embodiment of the present invention, which specifically illustrates the structure of the microscope.
Figure 11:
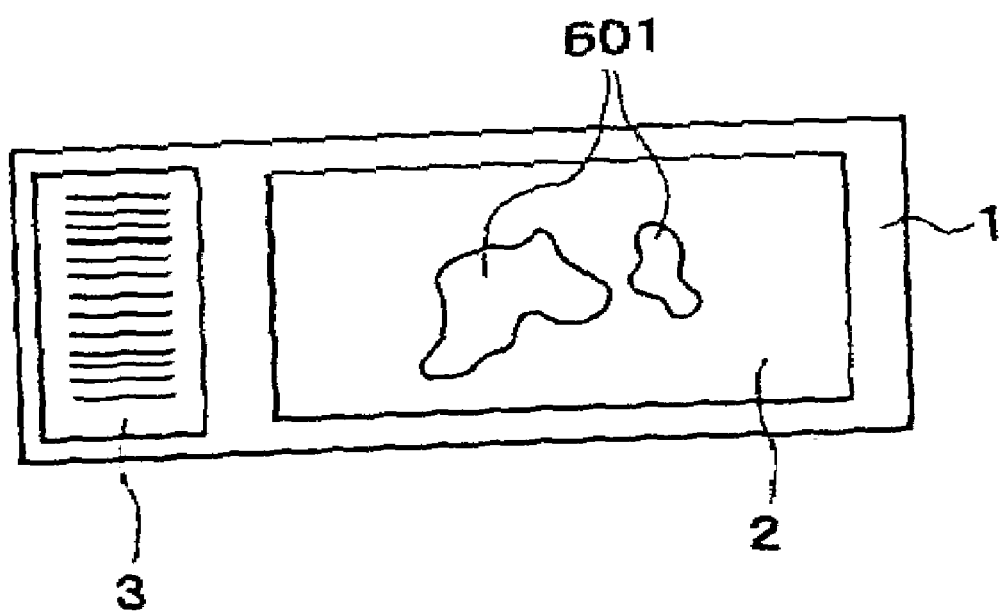
FIG. 11 is a top view of the slide glass used in the microscope system in the third embodiment and a bar code provided on the slide glass.

As shown in FIG. 10, a microscope system 1010 achieved in the third embodiment adopts a structure similar to that of the microscope system 810 achieved in the second embodiment. However, the microscope system 1010 further includes a read unit 42 provided inside the opening 41a at the housing 41, which reads an identification code such as a bar code provided on the slide glass 1. As shown in FIG. 11, a bar code 3, which is a code inherent to the specific slide glass 1 is provided at the slide glass 1. The microscope system 1010, in which a slide glass 1 having a bar code 3 affixed thereto is used, is enabled to identify a specific slide glass 1 currently placed on the specimen platform 27.

In the third embodiment, the memory 33c at the image processing unit 33 in the housing 41 further includes a bar code information memory 33f constituting an area for storing a table containing information on the bar code 3 in correspondence to the Z coordinate of the focused position, in addition to the focus position memory 33d and the initial value memory 33e.

Figure 12:
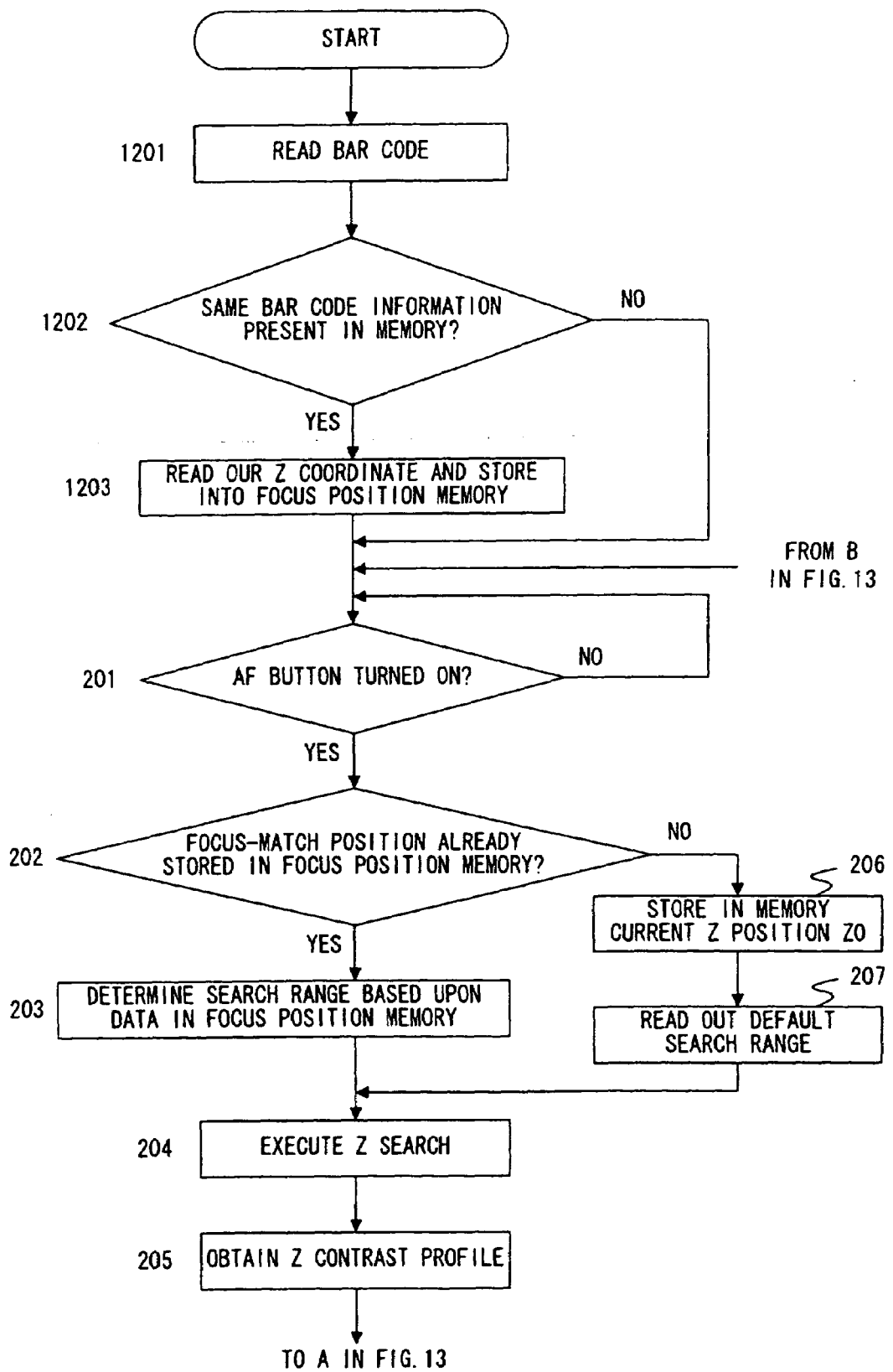
FIG. 12 presents a flowchart of the AF operation processing executed in the microscope system in the third embodiment.
Figure 13:
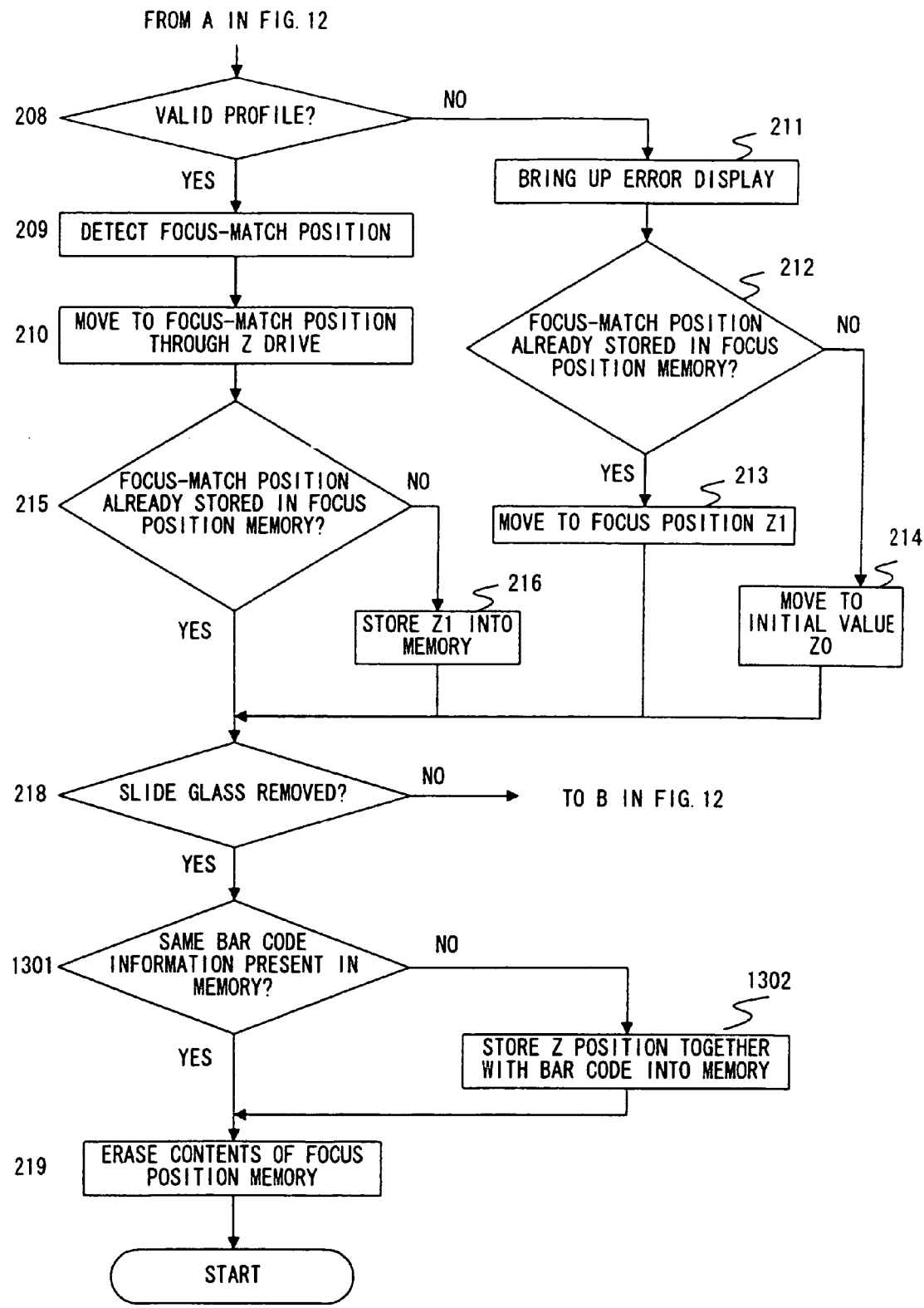
FIG. 13 presents a flowchart of the AF operation processing executed in the microscope system in the third embodiment.

FIGS. 12 and 13 present a flowchart of the operation executed at the image processing unit 33 in the third embodiment. The processing executed at the image processing unit 33 in the third embodiment is almost identical to that executed in the first embodiment. However, in the third embodiment, the bar code 3 at the slide glass 1 is read before detecting an AF operation start instruction issued through an operation of the control pad 36.

As a user performs an operation for loading a specimen via the control pad 36 included in the microscope system, the CPU at the image processing unit 33 issues an instruction for the read unit 42 to read the bar code 3 in step S1201. In step S1202, the bar code information thus read is referenced with the table in the bar code information memory 33f to make a decision as to whether or not identical bar code information is already stored. If an affirmative decision is made in step S1202, i.e., if the same bar code information is already stored in the memory 33f, the operation proceeds to step S1203.

In step S1203, information indicating the Z coordinate corresponding to the bar code information having been read is read out from the memory 33f. The Z coordinate that is readout in this step is the Z coordinate of the focused position having been detected and stored through a previous AF operation executed for the same slide glass 1. Accordingly, the CPU stores the Z coordinate corresponding to the bar code information into the focus position memory 33d. Then, the operation proceeds to step S201. The processing executed in steps S201 to S218 is identical to the processing in the flowchart presented in FIG. 2 which has been explained in reference to the first embodiment.

If an AF operation has been previously executed in conjunction with a given slide glass 1, the search range is determined in step S203 by using the Z coordinate of the focused position stored in the memory 33d. Thus, a focused position can be detected quickly by searching a narrow range centered around the Z coordinate of the previous focused position.

If an affirmative decision is made in step S218 in FIG. 13, i.e., if it is detected that the specimen platform 27 has been unloaded or that the slide glass 1 has been disengaged, the operation proceeds to step S1301. In step S1301, a decision is made as to whether or not information identical to the bar code information detected in step S1201 is already stored in the bar code information memory 33f. If a negative decision is made in step S1301, the operation proceeds to step S1302. In step S1302, the Z coordinate currently stored in the focus position memory 33d is stored into the bar code information memory 33f in correspondence to the bar code information.

Subsequently, the operation proceeds to step S219 to erase the data in the focus position memory 33d.

As a result, when the AF operation is again to be executed with the same slide glass 1 placed on the specimen platform 27, the Z coordinate that has been stored for the same slide glass 1 can be read out and used in step S1203.

As described above, in the microscope system achieved in the third embodiment, the Z coordinate of the focused position inherent to each slide glass 1 can be stored in memory. As a result, once an AF operation has been executed on a given slide glass 1, a focused position can be detected quickly over a narrow search range.

While the stage 20 is made to move along the z axis in order to detect the focused position for the specimen in the first to third embodiments explained above, the stage 20 may be provided as a fixed stage and the image forming optical system which includes the objective lens 14 may instead be made to move along the optical axis.

While the image processing unit 33 is provided as an independent component, separate from the microscope 10, as shown in FIG. 1, in the first embodiment described above, the present invention is not limited to this example and the image processing unit 33 may be housed inside the main body 11 of the microscope 10.

The above described embodiments are examples, and various modifications can be made without departing from the spirit and scope of the invention.

What is claimed is:

1. An auto focus device in a microscope system comprising:
    an image-capturing device, the image-capturing device capturing an image of a specimen placed on a stage in a microscope, which is formed via an image-forming optical system, and determining a contrast value of the captured image;
    a focused position detection device that detects a focused position along a Z-axis for the specimen based upon the contrast value;
    a focused position storage device that stores in memory the focused position detected by the focused position detection device; and
    a reset operation detection device that detects a reset operation for resetting memory contents at the focused position storage device, wherein:
    the focused position detection device sets a search range centered around the focused position stored in memory and erases the focused position in the focused position storage device once the reset operation is detected by the reset operation detection device.

2. An autofocus device comprising:
    a connection unit that connects with an image-capturing device, the image-capturing device capturing an image of a specimen placed on a stage in a microscope, which is formed via an image-forming optical system, and determining a contrast value of the captured image;
    a focused position detection device that detects a focused position along a Z-axis for the specimen based upon the contrast value obtained via the connection unit;
    a focused position storage device that stores in memory the focused position detected by the focused position detection device; and
    a reset operation detection device that detects a reset operation for resetting memory contents at the focused position storage device, wherein:
    the focused position detection device (1) sets a search range including the focused position stored in memory at the focused position storage device and outputs a command for detecting the focused position anew by moving the stage along an optical axis of the image forming optical system over the search range thus set and (2) erases the stored contents at the focused position storage device once the reset operation is detected by the reset operation detection device.

3. An autofocus device according to claim 2, further comprising:

the reset operation detection device that detects a replacement operation for replacing a slide glass used to hold the specimen;

an identification information detection device that detects identification information inherent to the slide glass and provided at the slide glass; and an identification information storage device that stores in memory the identification information detected by the identification information detection device, wherein:

if the reset operation detection device detects a removal operation for removing the slide glass, (1) the storage device stores the identification information on the slide glass detected by the identification information detection device and the focused position detected by the focused position detection device in correspondence to each other into the identification information storage device and (2) the focused position detection device resets the focused position in the focused position storage device; and if the reset operation detection device detects a mounting operation for mounting the slide glass, the identification information storage device reads out the focused position corresponding to the identification information on the slide glass detected by the identification information detection device from the identification information storage device and stores the focused position thus read out into the focused position storage device.

4. A microscope system comprising:

a focused position detection device that detects a focused position along a Z-axis for a specimen;

a focused position storage device that stores in memory information related to the focused position detected by the focused position detection device;

a search device that determines a search range based upon the focused position information stored in memory at the focused position storage device and controls the focused position detection device so as to perform a focused position detection operation within the search range;

a reset device that resets the focused position information stored in memory at the focused position storage device; and a control device that holds the focused position information in the focused position storage device once the focused position information is stored into the focused position storage device until the reset device is engaged in operation.

5. The microscope system according to claim 4, further comprising:

a slide glass detection device that detects a replacement operation for replacing a slide glass used to hold the specimen; an identification information detection device that detects identification information inherent to the slide glass and provided at the slide glass; and an identification information storage device that stores in memory the identification information detected by the identification information detection device, wherein:

if the slide glass detection device detects a removal operation for removing the slide glass, (1) the control device stores the identification information on the slide glass detected by the identification information detection device and the focused position information detected by the focused position detection device in correspondence to each other into the identification information storage device and (2) the reset device resets the focused position information in the focused position storage device; and if the slide glass detection device detects a mounting operation for mounting the slide glass, the control device reads out the focused position information corresponding to the identification information on the slide glass detected by the identification information detection device from the identification information storage device and stores the focused position information thus read out into the focused position storage device.

* * * * *